(12) United States Patent
Kugler et al.

(10) Patent No.: US 12,157,220 B2
(45) Date of Patent: Dec. 3, 2024

(54) POWER TOOL STAND

(71) Applicant: BLACK & DECKER INC., New Britain, CT (US)

(72) Inventors: Marco Kugler, Hesse (DE); Rafael Gottschling, Selters-Eisenbach (DE); Michael Kunz, Dorndorf (DE); Joerg Roth, Schwalheim (DE)

(73) Assignee: Black & Decker Inc., New Britain, CT (US)

( * ) Notice: Subject to any disclaimer, the term of this patent is extended or adjusted under 35 U.S.C. 154(b) by 153 days.

(21) Appl. No.: 17/929,192

(22) Filed: Sep. 1, 2022

(65) Prior Publication Data
US 2023/0117936 A1   Apr. 20, 2023

(30) Foreign Application Priority Data

Sep. 8, 2021 (GB) ..................................... 2112787

(51) Int. Cl.
*B25H 1/00* (2006.01)
*F16M 11/04* (2006.01)

(52) U.S. Cl.
CPC ......... *B25H 1/0042* (2013.01); *F16M 11/046* (2013.01); *B25H 1/0064* (2013.01); *F16M 2200/028* (2013.01)

(58) Field of Classification Search
CPC ... B23B 47/28; F11H 1/38; F11H 1/04; F11H 1/18; B25H 1/0064; B25H 1/0042
See application file for complete search history.

(56) References Cited

U.S. PATENT DOCUMENTS

| | | | | |
|---|---|---|---|---|
| 3,412,813 A | * | 11/1968 | Johnson | E21B 7/027 173/141 |
| 3,464,655 A | * | 9/1969 | Schuman | B28D 1/041 74/89.17 |
| 3,790,059 A | * | 2/1974 | Jacke | B29C 66/73921 D8/30 |
| 4,500,235 A | * | 2/1985 | Johnsen | B28D 1/041 403/379.4 |
| 4,540,149 A | * | 9/1985 | Rupprecht | B23Q 1/0063 248/669 |

(Continued)

FOREIGN PATENT DOCUMENTS

| | | |
|---|---|---|
| DE | 20017256 U1 | 12/2000 |
| DE | 10230460 A1 | 1/2004 |

(Continued)

OTHER PUBLICATIONS

Extended European Search Report mailed Nov. 28, 2022 in corresponding EP application No. 22194105.7, 7 pages.

(Continued)

*Primary Examiner* — Nathaniel C Chukwurah
(74) *Attorney, Agent, or Firm* — Stephen R. Valancius

(57) ABSTRACT

A power tool stand includes a base and a projecting frame connected to the base. The power tool stand also comprises a power tool carriage moveably mounted on the projecting frame. The power tool stand further comprises a tool interface mounted on the power tool carriage arranged to secure a removeable power tool. The power tool carriage comprises at least one duct having a duct inlet in fluid communication with a duct outlet.

20 Claims, 10 Drawing Sheets

(56) References Cited

U.S. PATENT DOCUMENTS

| | | | |
|---|---|---|---|
| 5,062,743 A * | 11/1991 | Wieland | B23Q 15/24 |
| | | | 408/11 |
| 6,223,794 B1 | 5/2001 | Jones | |
| 6,514,018 B2 | 2/2003 | Martinez et al. | |
| 6,792,735 B2 | 9/2004 | Mohlenhoff | |
| 6,981,560 B2 | 1/2006 | Nguyen et al. | |
| 7,347,651 B2 | 3/2008 | Hintze et al. | |
| 7,371,034 B2 | 5/2008 | Clark | |
| 7,476,066 B2 * | 1/2009 | Topf | B23B 51/00 |
| | | | 408/59 |
| 7,591,615 B2 | 9/2009 | Li et al. | |
| 8,337,124 B2 | 12/2012 | Nguyen | |
| 9,789,600 B2 * | 10/2017 | Jönsson | B25H 1/0042 |
| 2003/0111266 A1 | 6/2003 | Roach | |
| 2008/0083106 A1 | 4/2008 | Elsworthy | |
| 2013/0004255 A1 * | 1/2013 | Fischinger | B23B 39/00 |
| | | | 408/111 |
| 2016/0129582 A1 * | 5/2016 | Ullrich | B23Q 3/1543 |
| | | | 408/76 |
| 2017/0217010 A1 * | 8/2017 | Dey, IV | B25H 1/0071 |
| 2019/0283841 A1 * | 9/2019 | Farrell, III | B25H 1/0071 |
| 2019/0321896 A1 * | 10/2019 | Carlson | B25H 1/0042 |

FOREIGN PATENT DOCUMENTS

| | | |
|---|---|---|
| DE | 202005020829 U1 | 11/2006 |
| DE | 202005011822 U1 | 12/2006 |
| DE | 212018000029 U1 | 11/2018 |
| EP | 1671769 B1 | 3/2011 |
| EP | 3004517 B1 | 7/2018 |
| GB | 622855 A | 5/1949 |

OTHER PUBLICATIONS

GB Search Report mailed May 18, 2022 in corresponding GB application No. 2112787.3, 1 page.

* cited by examiner

POWER TOOL STAND

RELATED APPLICATIONS

This application claims priority under 35 U.S.C. § 119 to GB Patent Application No. 2112787.3, filed Sep. 8, 2021, which is incorporated by reference.

TECHNICAL FIELD

This application relates to a power tool stand, such as a power tool stand for a drill.

BACKGROUND

Some power tools are mountable on a tool stand. For example, certain drills can be mountable on a drill stand. This can improve the stability of the power tool during use and ensure that the power tool alignment with respect to the workpiece remains fixed during use. Furthermore, the power tool stand can be mountable onto the workpiece and this can further improve precision during operation.

One such power tool stand is shown in US 2019/0321896 which shows a drill stand on which a battery powered drill can be mounted. A problem with this is that the drill power tool is very large and heavy and this makes mounting and using the drill power tool on the drill power tool stand cumbersome. For example, the base of the drill power tool stand may need to be weighted down during use to stop it toppling over when used in a vertical orientation.

Once the drill described in US 2019/0321896 is mounted on the drill stand, then suitable dust management and lubrication management hoses may need to be attached to the drill. These hoses can interfere with the operation of the drill when installed on the drill stand. This may makes setup, use and removal of the drill on the drill stand awkward and time consuming.

SUMMARY

According to an aspect of the present disclosure there is a power tool stand including a base; a projecting frame connected to the base; a power tool carriage moveably mounted on the projecting frame; and a tool interface mounted on the power tool carriage arranged to secure a removeable power tool; wherein the power tool carriage comprises at least one duct having a duct inlet in fluid communication with a duct outlet.

Optionally, the at least duct is a water duct connectable to a supply of water. Optionally, the at least one duct is an air duct connectable to supply of air or a vacuum supply. Optionally, the duct inlet is connectable with a portion of the removeable power tool and/or a nozzle when mounted on the power tool carriage. Optionally, one of the at least one air duct and the at least one water duct is inside the other along at least a portion of their length. Optionally, the at least one air duct is connectable to a dust extractor or vacuum device. Optionally, the at least one duct comprises an inlet on a first side of the power tool carriage. Optionally, the inlet comprises a toolless connection arranged to connect to a water hose, an air hose or a vacuum hose. Optionally, the at least one duct is connectable to an adaptor mountable on the removeable power tool wherein the adaptor comprises a guide duct arranged to guide fluid to or from a cutting tool. Optionally, the guide duct comprises a snap-fit connection mountable on the at least one duct. Optionally, the at least one duct comprises an outlet on a second side of the power tool carriage. Optionally, the tool interface is mounted on the second side of the power tool carriage. Optionally, the at least one duct is connectable to a valve arranged to selectively adjust the flow of fluid to and/or from the portion of the removeable power tool.

Optionally, the power tool stand comprises a locking mechanism arranged to secure the removeable power tool to the power tool carriage in a locked position and release the removeable power tool in an unlocked position. Optionally, the power tool carriage comprises a housing and the at least one duct is routed inside the housing. Optionally, the power tool carriage is slidable along a longitudinal axis of the projecting frame. Optionally, the tool interface is configured to mechanically and electrically connected the removeable power tool to the power tool carriage. Optionally, a battery interface is mounted on the power tool carriage arranged to mechanically and electrically connect a removeable battery to the power tool carriage. Optionally, the battery interface is electrically connected to the tool interface. Optionally, the power tool carriage comprises at least one accessory electrical interface configured to connect to at least one accessory. Optionally, the at least one accessory electrical interface comprises an electrical socket. Optionally, the at least one accessory electrical interface is electrically connected to the battery interface wherein the removeable battery supplies power to the at least one accessory when the removeable battery is mounted on the battery interface and the at least one accessory is electrically connected to the at least one accessory electrical interface. Optionally, the at least one accessory is one or more of a water pump, a dust extractor or a vacuum device.

Various other aspects and further examples are also described in the following detailed description and in the attached claims with reference to the accompanying drawings.

DETAILED DESCRIPTION

Figure 1:
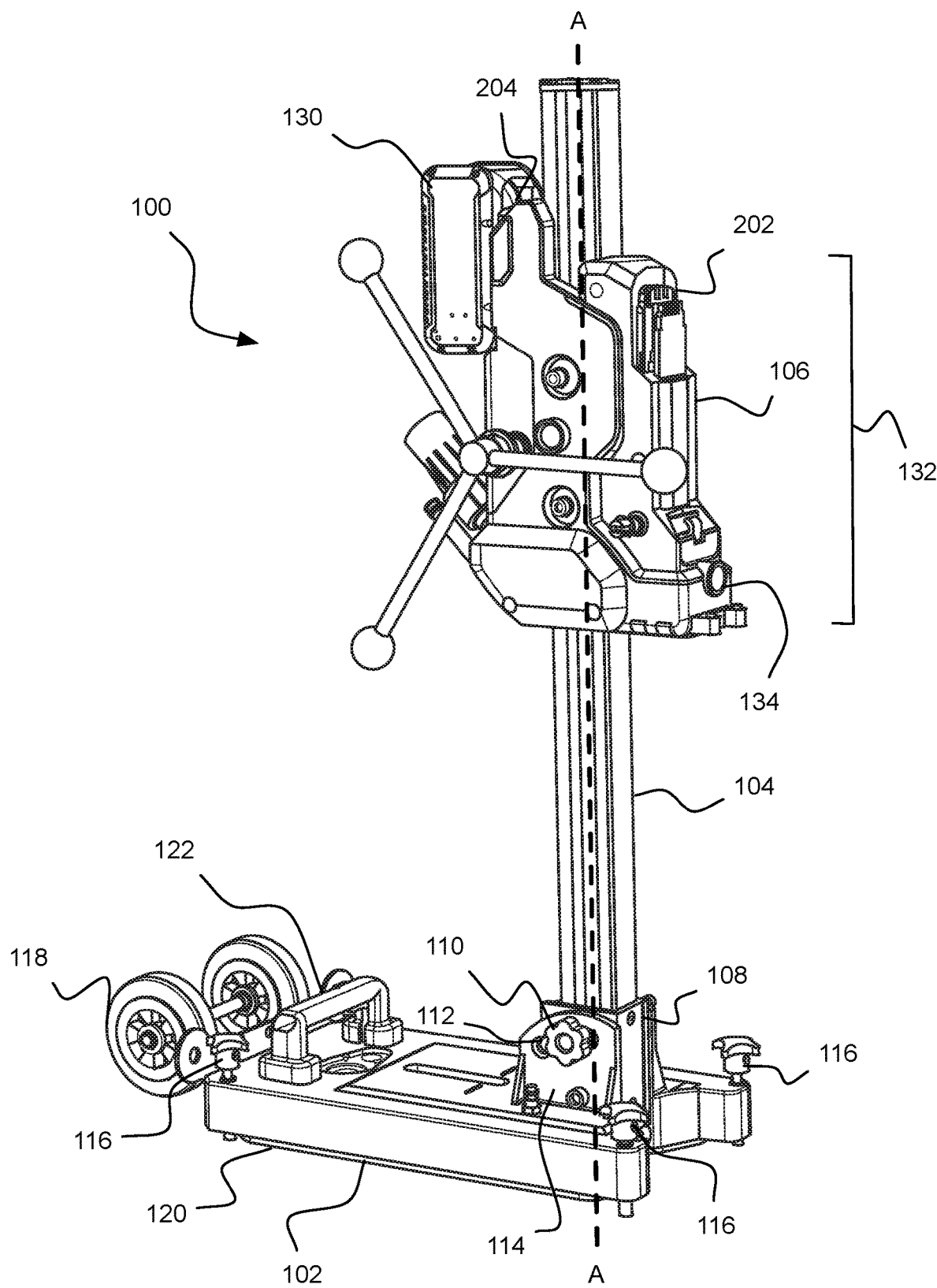
FIG. 1 shows a perspective view of the power tool stand of an example.

FIG. 1 shows a perspective view of a power tool stand 100 according to an example. The power tool stand 100 is arranged to receive a removeable power tool 300 (not shown in FIG. 1, but best shown in FIG. 3). The removeable power tool 300 can be mounted and secured in the power tool stand 100 as required by the user. The term "removeable" refers to the function of the removeable power tool 300 being selectively removeable from the power tool stand 100. In other words, the removeable power tool 300 is not permanently fixed to the power tool stand 100.

The power tool stand 100 comprises a base 102 and a projecting frame 104 fixed to the base 102. A power tool carriage 106 is moveably mounted on the projecting frame 104 and moveable along a longitudinal axis A-A of the projecting frame 104. By moving the power tool carriage 106 along the projecting frame 104, the distance between the power tool carriage 106 and the base 102 can be varied. The projecting frame 104 projects through a through hole 700 (best shown in FIG. 7). The power tool carriage 106 is optionally moveably coupled to projecting frame 104 via a carriage mechanism 500 (best shown in FIG. 5). The carriage mechanism 500 will be discussed in further detail below in reference to FIG. 5.

The power tool carriage 106 will now be discussed in more detail below with respect to FIG. 2.

Figure 2:
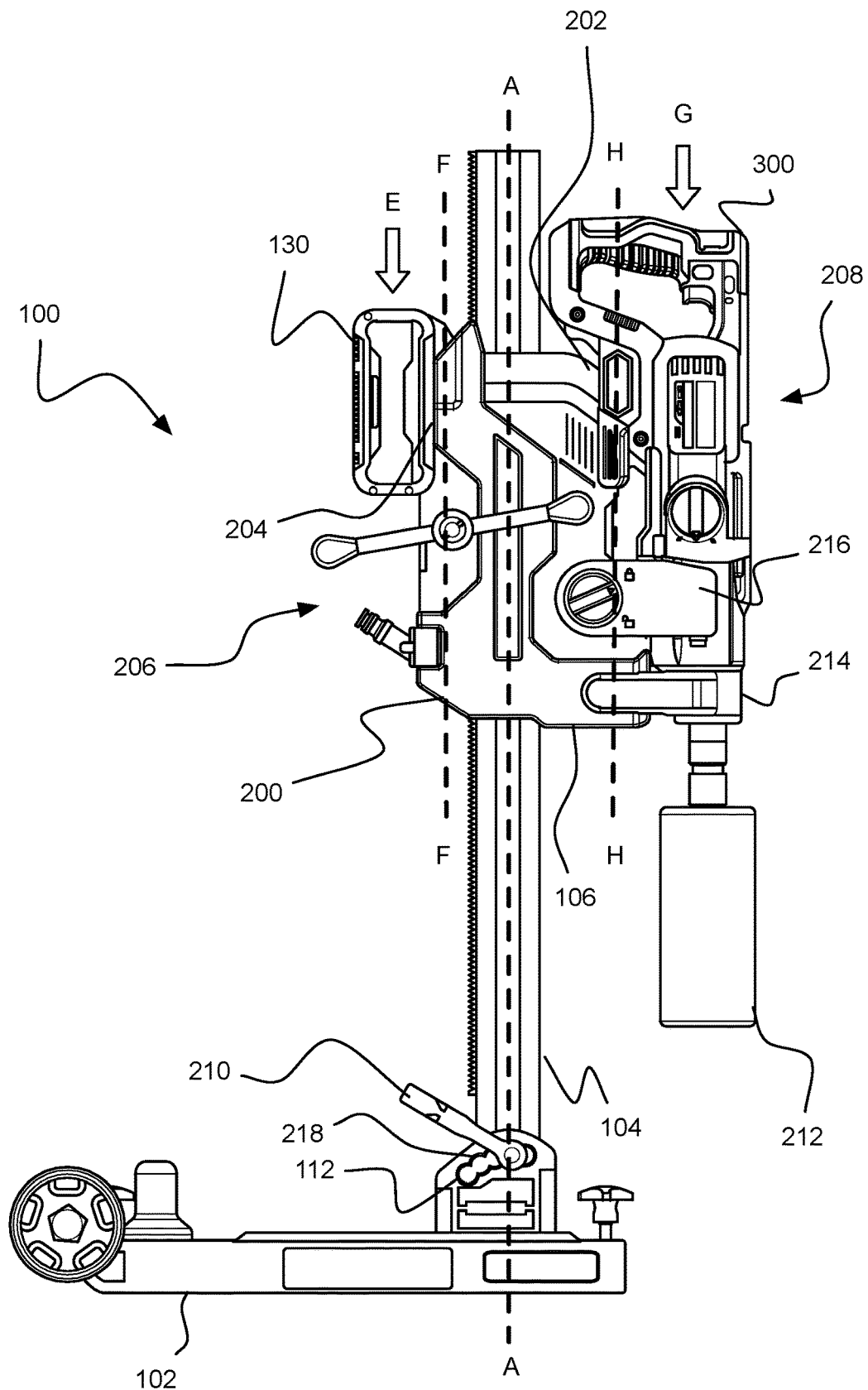
FIG. 2 shows side view of a power tool stand with a power tool and battery mounted on the power tool stand according to an example.
Figure 4:
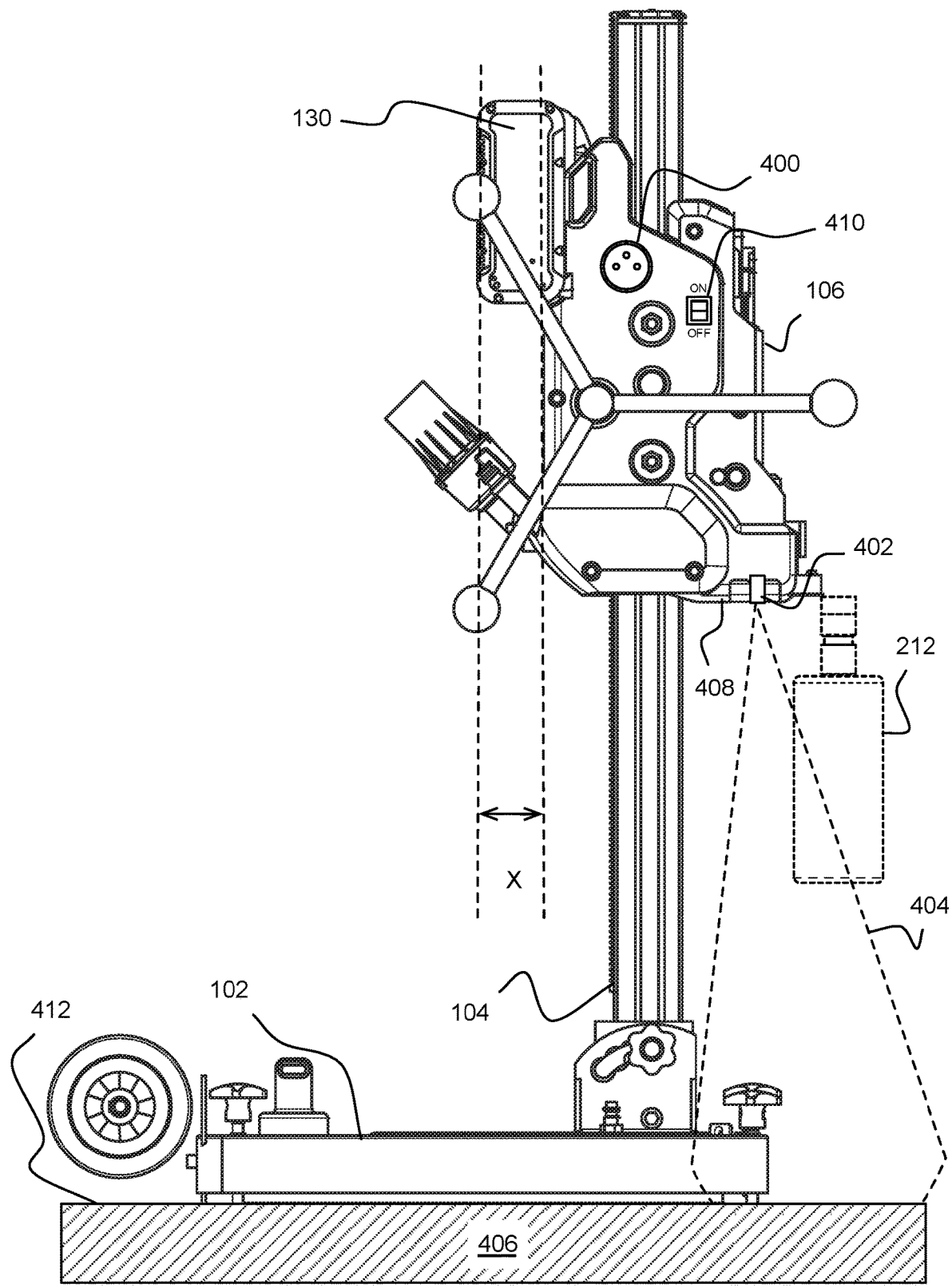
FIG. 4 shows another side view of the power tool stand of an example.

The projecting frame 104 as shown in FIG. 2 (and FIG. 1) is substantially upright. In some examples, the power tool stand 100 can be used in the orientation as shown in FIG. 2 and in this case, the projecting frame 104 will remain substantially upright positioned on a workpiece surface 412. The workpiece surface 412 is best shown in FIG. 4. However, in some other examples, the power tool stand 100 can be used in a substantially horizontal orientation. In this case, the projecting frame 104 will be substantially horizontal. Indeed, the power tool stand 100 may be used in any orientation as required and the position of the projecting frame 104 will be adjusted accordingly.

The projecting frame 104 as shown in FIG. 2 is a single post projecting up from the base 102. However, in other examples the projecting frame 104 can optionally comprise a plurality of posts (not shown) projecting up from the base 102 and the power tool carriage 106 may be mounted on the plurality of posts. The projecting frame 104 as shown in FIG. 1 is mounted perpendicular to the plane of the base 102 at a coupling 108. The plane of the base can be substantially parallel with the plane of a workpiece 406 (best shown in FIG. 4).

In some examples the coupling 108 optionally comprises a pivot connection and the projecting frame 104 is pivotable with respect to the base 102. In this way, the projecting frame 104 can be angled with respect to a normal axis (not shown) of the plane of a workpiece 406. The normal axis of the plane of the workpiece 406 and the base 102 is parallel with the longitudinal axis A-A as shown in FIG. 1.

The coupling 108 comprises a screw fastener 110 threaded through arcuate slots 112 in a pair of projecting plates 114 fixed to the base 102. The screw fastener 110 is screwed into the projecting frame 104 or into a reciprocal fastening nut 210 (as shown in FIG. 2) on the opposite side of the projecting frame 104. When the screw fastener 110 and reciprocal fastening nut 210 are tightened against the projecting plates 114 and the projecting frame 104, frictional forces keep the projecting frame 104 fixed with respect to the base 102. Other fastening mechanisms e.g. clips, clamps, or any other suitable means can be used to fix the projecting frame 104 with respect to the base 102.

The pair of projecting plates 114 each comprise an arcuate slot 112 and form a yoke for receiving a portion of the projecting frame 104 between the projecting plates 114. The yoke as shown in FIG. 1 is optional and other pivot connections can be provided. For example, a single projecting plate 114 can be used to couple the base 102 to the projecting frame 104. In some examples, the arcuate slot 112 optionally comprises a plurality of indexing positions 218 for positioning the reciprocal fastening nut 210 and the screw fastener 110 at predetermined positions along the arcuate slot 112.

Optionally, the projecting plates 114 comprise a inclination scale (not shown) to indicate the angle of the projecting frame 104 with respect to the plane of the base 102. In some examples the projecting frame 104 is arranged to pivot between 0 to 60 degrees from a normal axis (not shown) perpendicular to the base 102. In other examples, the projecting frame 104 can pivot any angle with respect to a normal axis perpendicular to the base 102.

In some examples, the projecting frame 104 is alternatively permanently fixed with respect to the base 102. In this case the projecting frame 104 cannot be adjusted with respect to the base 102. For example, the projecting frame 104 is welded to the base 102 in the upright position as shown in FIG. 1.

In some examples, the projecting frame 104 can be pivotable with respect to base 102 such that the longitudinal axis A-A of the projecting frame 104 can be positioned parallel with the plane of the base 102. This can be useful for transporting the power tool stand 100 to the work site.

In some examples, the projecting frame 104 comprises a reinforced cross-sectional shape for increasing rigidity of the projecting frame 104. The projecting frame 104 can optionally comprise an I-beam cross-sectional shape in some examples.

In some examples, base 102 comprise one or more fixing bolts 116 for anchoring the base 102 of the power tool stand 100 to the workpiece 406. FIG. 1 shows the base 102 comprising four fixing bolts 116 located at each corner of the base 102. In some examples, there can be additional or fewer fixing bolts 116 for anchoring the base 102 to the workpiece 406 as required.

The fixing bolts 116 allow the power tool stand 100 to be securely fastened to a workpiece 406 surface in a horizontal plane (e.g. as shown in FIG. 4), a vertical plane, or an inclined surface. For example, a user may use the fixing bolts 116 to anchor the power tool stand 100 to a floor or a wall before operation.

When the user anchors the base 102 to a vertical surface such as a wall (not shown), the user may disassemble the power tool stand 100 and remove the projecting frame 104 from the base 102. Once the user has anchored the base 102 to the wall, the user may then reattach the projecting frame 104 back on the base 102.

The base 102 optionally comprises wheels 118 for transporting the power tool stand 100 to the worksite. The wheels 118 are mounted on the base 102 such that the wheels 118 do not project beyond an engaging surface 120 of the base 102. The engaging surface 120 is arranged to abut the workpiece surface 412. Accordingly, the wheels 118 do not touch the workpiece surface 412 when the engaging surface 120 abuts the workpiece surface 412. In some examples, the wheels 118 are optionally removeable. This means the user can remove the wheels 118 when placing the power tool stand in tight spaces on a wall or a floor.

The base 102 can optionally further comprise one or more stand handles 122 for also assisting transportation and handling. The user can optionally grasp the stand handle 122 mounted on the base 102 and the projecting frame 104 in order to move the power tool stand 100 into position.

The power tool stand 100 will now be discussed in more detail with respect to FIG. 2. FIG. 2 shows side view of the power tool stand 100 with the removeable power tool 300 and the removeable battery 130 mounted on the power tool stand 100.

The projecting frame 104 allows a power tool carriage 106 to be precisely moved along the longitudinal axis A-A and then fixed with respect to the projecting frame 104.

As shown in FIG. 2, the power tool carriage 106 is arranged to receive a removeable power tool 300 and a removeable battery 130.

The power tool carriage 106 comprises a carriage housing 200. The carriage housing 200 comprises a clam shell type construction having two halves which are fastened together. The halves of the carriage housing 200 are fastened together with screws but in alternative examples any suitable means for fastening the carriage housing 200 together may be used such as glue, clips, bolts and so on. For the purposes of clarity, the fastenings in the carriage housing 200 are not shown in FIG. 2. The carriage housing 200 can comprise a unitary element surrounding the internal components of the power tool carriage 106. In other examples, the carriage housing 200 can comprise one or more housing portions (not shown) which are mounted together to form the carriage housing 200.

The power tool carriage 106 comprises a power tool interface 202 arranged to electrically and mechanically connect the removeable power tool 300 to the power tool carriage 106.

The power tool carriage 106 further comprises a battery interface 204 arranged to electrically and mechanically connect the removeable battery 130 to the power tool carriage 106.

The power tool interface 202 and the battery interface 204 are electrically connected together via one or more internal wires 502 routed inside the carriage housing 200. The internal wires 502 are schematically represented by the dotted line in FIG. 5. The internal wires 502 can be for example a flexible connection ribbon arranged to electrically couple pairs of electrical contacts on the power tool interface 202 and the battery interface 204. In other examples, power tool interface 202 and the battery interface 204 can be electrically connected by separate wires, a printed circuit board or any other suitable means for electrically connecting the power tool interface 202 and the battery interface 204.

In this way, when the removeable power tool 300 and the removeable battery 130 are respectively electrically connected to the power tool interface 202 and the battery interface 204 when mounted to the power tool carriage 106. This means that when mounted to the power tool carriage 106, the removeable battery 130 can supply power to the removeable battery 130. Accordingly, the removeable power tool 300 can be powered by the removeable battery 130 when the removeable power tool 300 and the removeable battery 130 are mounted on the power tool carriage 106 as if the removeable battery 130 and the removeable power tool 300 are directly coupled together.

Figure 3:
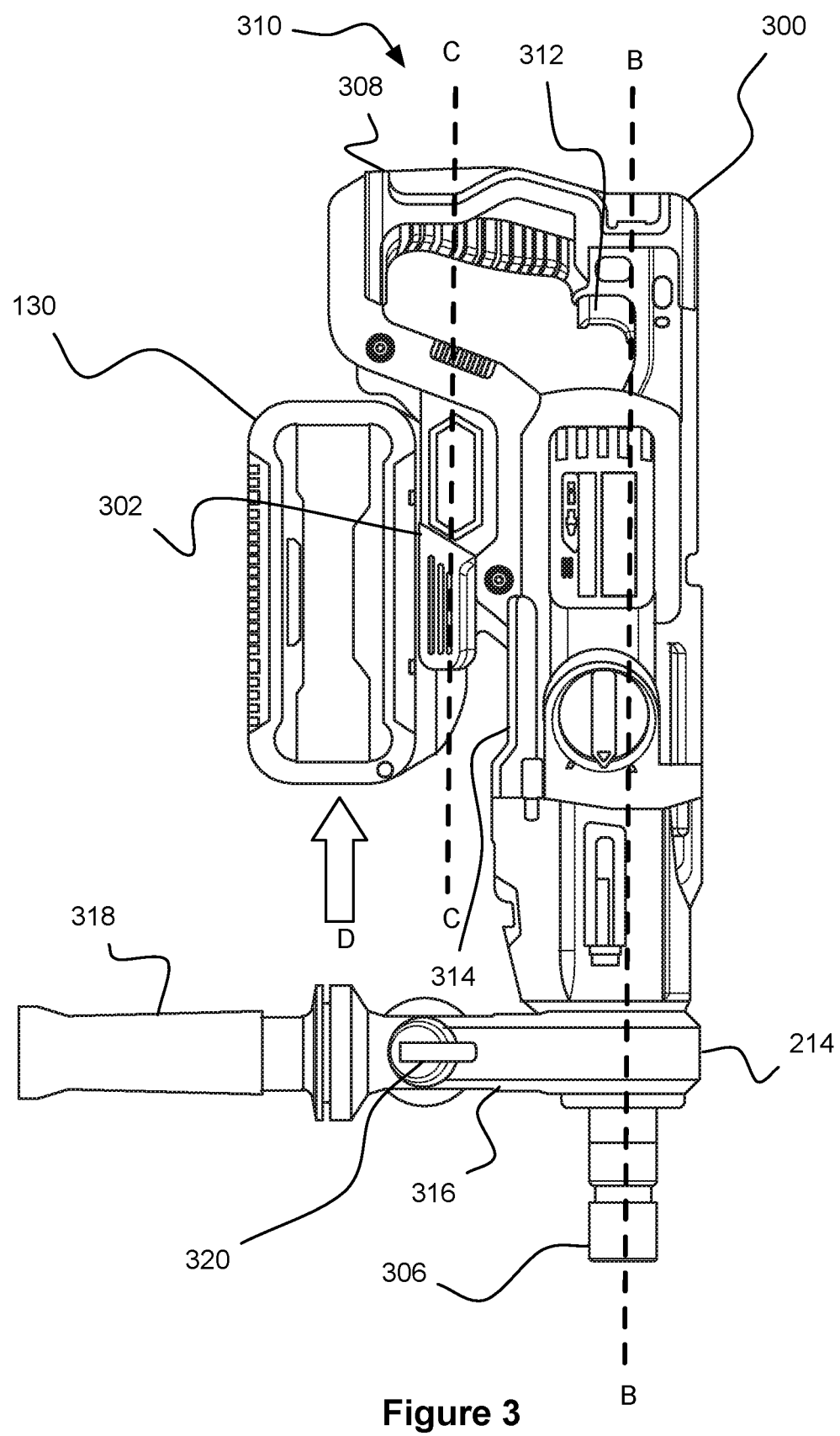
FIG. 3 shows a side view of an example power tool mountable on the power tool stand of an example.

In some examples, operation of the removeable power tool 300 when mounted on the power tool stand 100 is no different from when the removeable power tool 300 is directly connected to the removeable battery 130 as shown in FIG. 3. The user can therefore intuitively use the removeable power tool 300 when mounted on the power tool carriage 106.

As discussed above, both the removeable power tool 300 and the removeable battery 130, are mechanically secured to the power tool carriage 106. This means that the power tool carriage 106 moves in unison with the removeable power tool 300 and the removeable battery 130. This can help the user stabilise the removeable power tool 300 during use and improves the quality of the cut in the workpiece 406.

In some examples, the power tool interface 202 mounted on the power tool carriage 106 is compatible with the interface on the removeable battery 130. Similarly, the battery interface 204 mounted on the power tool carriage 106 is compatible with the interface on the removeable power tool 300. By providing compatible interfaces between the power tool carriage 106, the removeable power tool 300 and the removeable battery 130, the removeable power tool 300 and the removeable battery 130 can be mounted on each other or on the power tool carriage 106. Compatible interfaces means that the power tool interface 202, and the battery interface 204 can electrically and mechanically couple respectively with the removeable power tool 300 and the removeable batter 130 without have identical structures. For example, there can be small structural variations in the power tool interface 202, and the battery interface 204 in order to incorporate them into the power tool carriage 106.

In some other examples, the power tool interface 202 mounted on the power tool carriage 106 is the same as the interface on the removeable battery 130. Similarly, the battery interface 204 mounted on the power tool carriage 106 is the same as the interface on the removeable power tool 300. Advantageously this means that the same mechanical and electrical interface which mechanically and electrically connect the removeable battery 130 to the removeable power tool 300 (e.g. as shown in FIG. 3) can be used to mechanically and electrically connect the removeable battery 130 and the removeable power tool 300 separately to the power tool carriage 106.

This means that the same method of attaching the removeable battery 130 to the removeable power tool 300 can be used for attaching each of the removeable battery 130 and the removeable power tool 300 to the power tool carriage 106. This means that mounting the removeable battery 130 and the removeable power tool 300 to the power tool carriage 106 is intuitive for the user already familiar with the removeable battery 130 and the removeable power tool 300.

FIG. 2 shows the longitudinal axis of the projecting frame 104. Furthermore, FIG. 2 shows a first interface plane F-F aligned with a plane of the battery interface 204 mounted on the power tool carriage 106. The removeable battery 130 is mountable on the power tool carriage 106 in a direction E represented by the arrow. In some examples, the removeable battery 130 is mountable in the direction E towards the base 102. In some examples, the first interface plane F-F is substantially parallel with the longitudinal axis A-A of the projecting frame 104.

FIG. 2 also shows a second interface plane H-H aligned with a plane of the power tool interface 202 mounted on the power tool carriage 106. The removeable power tool 300 is mountable on the power tool carriage 106 in a direction G represented by the arrow. In some examples, the removeable power tool 300 is mountable in a direction G towards the base 102. In some examples, the second interface plane H-H is substantially parallel with the longitudinal axis A-A of the projecting frame 104. In some examples, the first and second interface planes are substantially parallel.

As shown in FIG. 2, the removeable battery 130 and the removeable power tool 300 are optionally mountable in the same direction E, G with respect to the power tool carriage 106. This is advantageous because the user can use a similar pushing action in the same direction E, G to mount both the removeable battery 130 and the removeable power tool 300 on the power tool stand 100. For example, the user can stand over the power tool stand 100 as shown in FIG. 1 and push down both the removeable power tool 300 and the removeable battery 130 to mount them on the power tool carriage 106. This can make assembly of the removeable power tool 300 and the removeable battery 130 on the power tool carriage 106 easier and more intuitive.

In order to mount the removeable battery 130 and the removeable power tool 300 on the power tool carriage 106, in some examples, both the removeable battery 130 and the removeable power tool 300 slide into mechanical engagement with the power tool carriage 106. The sliding action of the removeable battery 130 and the removeable power tool 300 continues until a latch mechanism (not shown) engages between the power tool carriage 106 and the removeable battery 130 and/or the removeable power tool 300. In some examples, the battery interface 204 and the power tool interface 202 comprise two latch mechanisms which are the same as the latch mechanism used to hold the removeable battery 130 in engagement when the mounted to the removeable power tool 300.

The direction E, as shown in FIG. 2, is the direction that the removeable battery 130 is mounted on the power tool carriage 106. The direction E is in a direction opposite to the direction D that the removeable battery 130 is mounted on the removeable power tool 300, as shown in FIG. 3.

Turning to FIG. 3, the removeable power tool 300 will now be discussed in more detail. FIG. 3 shows a side view of an the removeable power tool 300.

The removeable power tool 300 is an example of a removeable power tool 300 that is mountable on the power tool stand 100. The removeable power tool 300 as shown in FIG. 3 is a drill. In particular, the removeable power tool 300 is a diamond core drill. In other examples, the removeable power tool 300 can be hammer drill, a router, a reciprocating saw, plunge saw, a circular saw, an impact driver, a drill, a hammer drill, a multitool, an oscillating tool, a rotary hammer, a chipping hammer or any other similar power tool mountable on a power tool stand 100.

The removeable power tool 300 is battery powered and comprises a tool mounted battery interface 302 for engaging with the reciprocal interface on the removeable battery 130. The removeable power tool 300 is generally elongate and comprises a longitudinal axis B-B. The removeable power tool 300 and the removeable battery 130 are engageable along a third interface plane C-C. The third interface plane C-C is parallel with the longitudinal axis B-B of the removeable power tool 300. This means that the removeable battery 130 is mounted on the tool mounted battery interface 302 by sliding the removeable battery 130 in a direction D indicated by the arrow in FIG. 3. The direction D is away from the nose 306 of the removeable power tool 300 and towards a rear power tool handle 308 located at the rear 310 of the removeable power tool 300.

In order to mount the removeable power tool 300 and the removeable battery 130 on the power tool stand 100, the removeable battery 130 is disengaged from the removeable power tool 300. This is achieved by reversing the sliding action described above in reference to FIG. 3. The separate removeable power tool 300 and the removeable battery 130 can then be individually mounted on the power tool carriage 106.

Figure 6B:
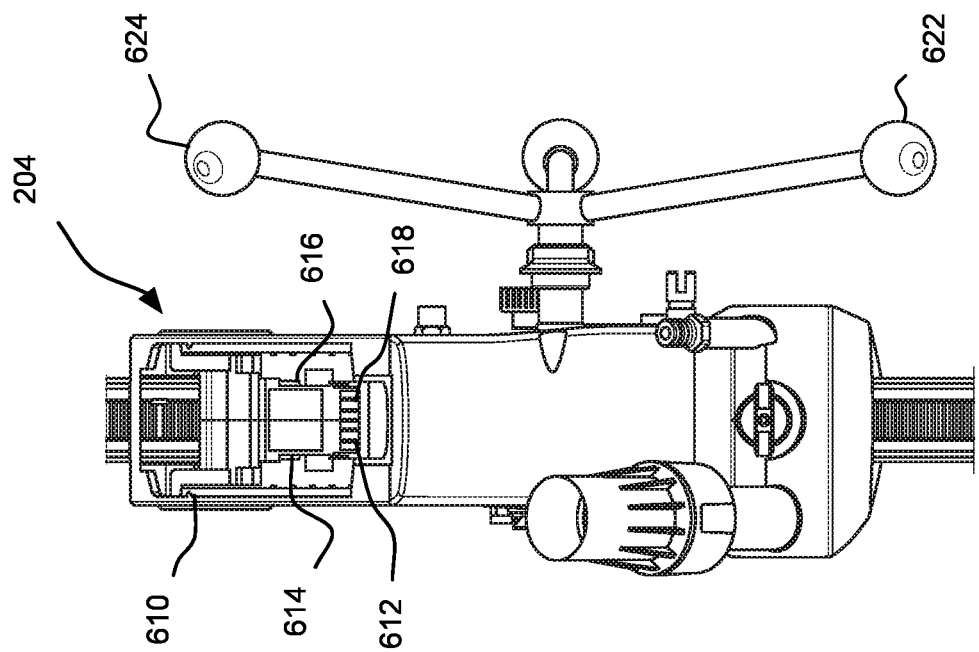
FIGS. 6a and 6b respectively show a partial front and rear view of the power tool stand of an example.
Figure 6A:
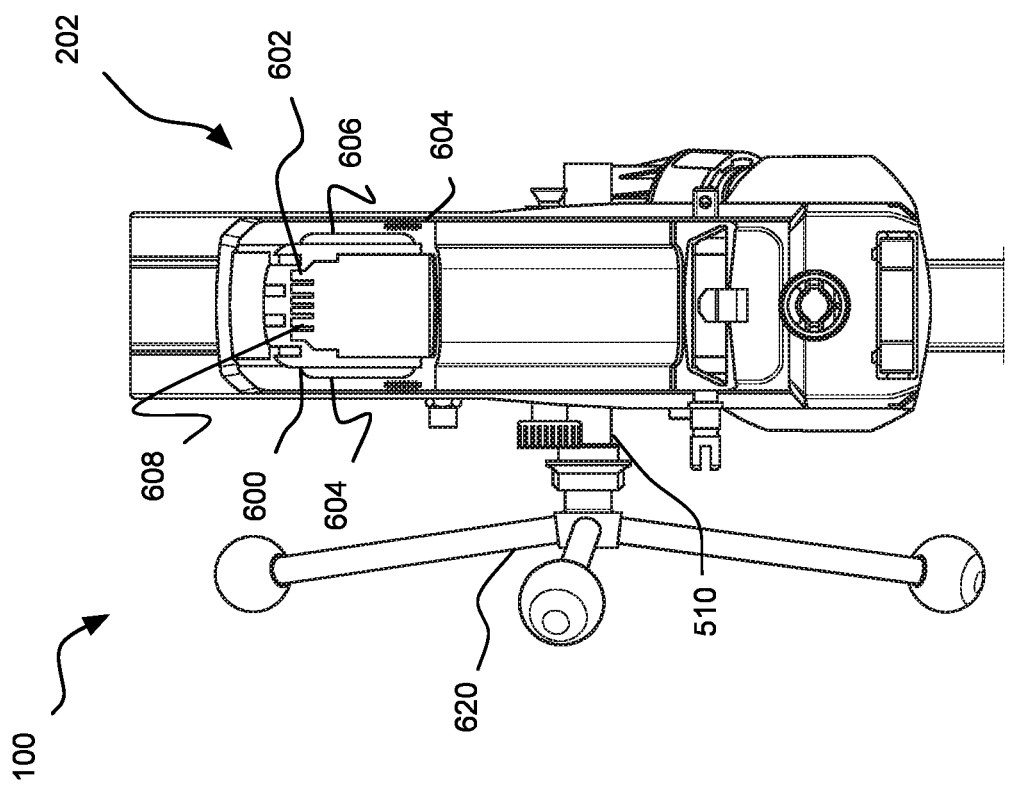

Mounting the removeable power tool 300 and the removeable battery 130 on the power tool stand 100 will now be discussed in more detail in reference to FIGS. 6a, and 6b. FIGS. 6a and 6b respectively show a partial front and rear view of a power tool stand 100.

FIGS. 6a and 6b respectively show the power tool interface 202 and the battery interface 204 without the removeable power tool 300 or the removeable battery 130 mounted thereon for the purposes of clarity.

The power tool interface 202 as shown in FIG. 6a comprises a power tool mechanical interface 600 and a power tool electrical interface 602. In some examples, the power tool mechanical interface 600 and the power tool electrical interface 602 are integral with the carriage housing 200. For example, the power tool mechanical interface 600 and the power tool electrical interface 602 are moulded into the carriage housing 200. In some examples, the power tool mechanical interface 600 and the power tool electrical interface 602 are positioned together or near each other on the carriage housing 200. In some other less preferred examples, the power tool mechanical interface 600 and the power tool electrical interface 602 are located remote from each other on the carriage housing 200.

As shown in FIG. 6a, the power tool mechanical interface 600 optionally comprises a pair of rails 604, 606 configured to engage with reciprocal slots mounted on the removeable power tool 300. The pair of rails 604, 600 slide into engagement with the reciprocal slots and secure the removeable power tool 300 to the power tool carriage 106.

The power tool electrical interface 602 optionally comprises a plurality of electrical contact clips 608 configured to engage a plurality of reciprocal projecting contact ribs (not shown) mounted on the removeable power tool 300. For the purposes of clarity only one electrical contact clip 608 is shown. The power tool mechanical interface 600 and the power tool electrical interface 602 are one optional way of connecting the removeable power tool 300 to the power tool carriage 106.

The battery interface 204 as shown in FIG. 6b comprises a battery mechanical interface 610 and a battery electrical interface 612. In some examples, the battery mechanical interface 610 and the battery electrical interface 612 are integral with the carriage housing 200. For example, the battery mechanical interface 610 and the battery electrical interface 612 are moulded into the carriage housing 200. In some examples, the battery mechanical interface 610 and battery electrical interface 612 are positioned together or near each other on the carriage housing 200. In some other less preferred examples, the battery mechanical interface 610 and the battery electrical interface 612 are located remote from each other on the carriage housing 200.

The battery mechanical interface 610 optionally comprises a pair of slots 614, 616 configured to engage with reciprocal rails mounted on the removeable battery 130. The battery electrical interface 612 comprises a plurality of projecting electrical contact ribs 618 configured to engage a plurality of reciprocal electrical contact clips (not shown) mounted on the removeable battery 130. For the purposes of clarity only one projecting electrical contact rib 618 is labelled in FIG. 6b. The battery mechanical interface 610 and the battery electrical interface 612 are one optional way of connecting the removeable power tool 300 to the power tool carriage 106.

In some examples, each of the power tool mechanical interface 600 and the battery mechanical interface 610 can optionally comprises a plurality of rails and slots to further improve the mechanical engagement when mounting the removeable power tool 300 and the removeable battery 130 on the power tool carriage 106. For example, each of the power tool mechanical interface 600 and the battery mechanical interface 610 can each comprise both slots and rails arranged to respectively engage with reciprocal rails and slots.

Alternatively, other mechanisms and features can be used for securely connecting the removeable power tool 300 to the power tool carriage 106. For example, in some less preferred alternatives, the rail and slot arrangement as discussed above is not used for mechanically securing the removeable battery 130 and the removeable power tool 300 to the power tool carriage 106. In this case, other external features on the removeable battery 130 and the removeable power tool 300 are used to securely fasten the removeable battery 130 and the removeable power tool 300 to the power tool carriage 106. In some examples, latches, straps, clips, clamps or any other suitable securing mechanism can be used to secure the removeable battery 130 and the removeable power tool 300.

As mentioned above, in some less preferred examples, the battery interface 204 comprises a battery mechanical interface 610 and a battery electrical interface 612 in separate locations on the power tool carriage 106. Similarly, the power tool interface 202 comprises a power tool mechanical interface 600 and a power tool electrical interface 602 in separate locations on the power tool carriage 106. This can be optionally achieved by making a separate electrical connection not using the previously discussed electrical contacts. For example, the battery electrical interface 612 and the power tool electrical interface 602 can be flexible ribbons projecting through the carriage housing 200 and the flexible ribbons have a plurality of electrical contacts connected thereto. The flexible ribbons can be manually attached to the ensure an electrical connection with the removeable power tool 300 and the removeable battery 130.

In another less preferred example, the removeable battery 130 can be mounted on the power tool carriage 106 in a different direction e.g. opposite or inclined to the direction that the removeable power tool 300 is mounted on the power tool carriage 106.

The removeable power tool 300 is optionally mechanically connected to the power tool carriage 106 only at the power tool mechanical interface 600. However, in some other examples as shown in e.g. FIG. 2, the removeable power tool 300 is mounted to the power tool carriage 106 at a plurality of other mechanical couplings in addition to the power tool mechanical interface 600. A collar piece 214 may optionally be secured near the nose 306 of the removeable power tool 300 and coupled to the power tool carriage 106 via a hollow front handle 318. The removeable power tool 300 can further be positioned between a pair of guide ribs 216.

In addition, one or more power tool engagement surfaces 132 on the power tool carriage 106 can abut the underside surface 314 of the removable power tool 300. By mounting the removeable power tool 300 to the power tool carriage 106 at a plurality of mechanical couplings 214, 216, 600, the removable power tool 300 does not move with respect to the power tool carriage 106. This means that the user can have the confidence that the removeable power tool 300 is securely mounted to the power tool stand 100 when performing a cutting operation.

Figure 5:
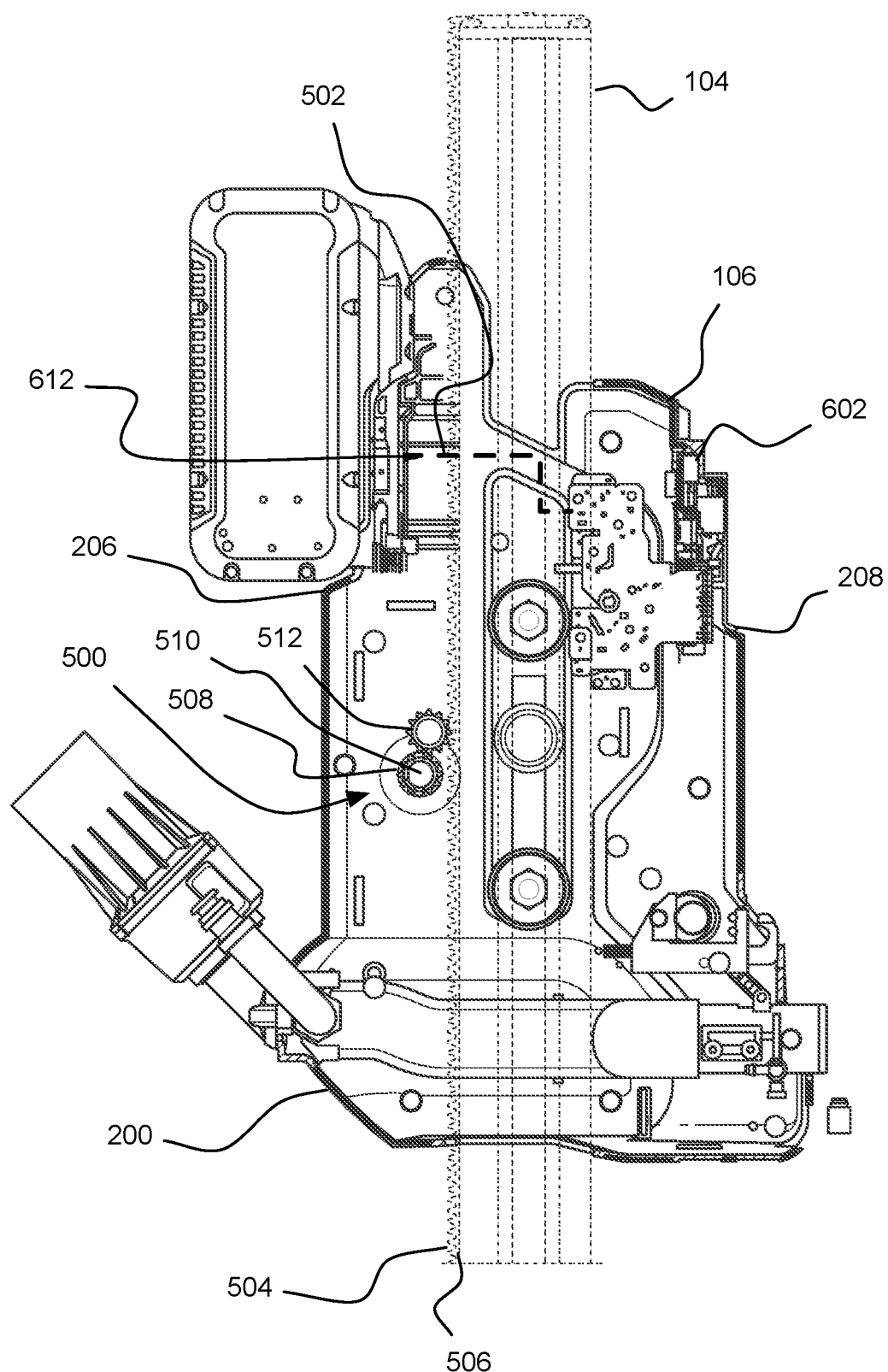
FIG. 5 shows a cross-sectional side view of the power tool stand of an example.

As can be seen from FIG. 2 and FIG. 5, the removeable battery 130 is mounted on a first side 206 of the power tool carriage 106. FIG. 5 shows a cross-sectional side view of the power tool stand 100 according to an example. The removeable power tool 300 is mounted on a second side of the power tool carriage 106. The first side 206 and the second side 208 of the power tool carriage 106 are positioned either side of the projecting frame 104. Accordingly, the first side 206 and the second side 208 of the power tool carriage 106 are on opposite sides of the power tool carriage 106.

The power tool carriage 106 conveniently positions the removeable battery 130 remote from the removeable power tool 300 when both mounted on the power tool carriage 106. This means that the weight of the removeable power tool 300 and the removeable battery 130 can be better distributed about the projecting frame 104. For example, the removeable power tool 300 can be mounted closer to the projecting frame 104. This reduces the turning moment of the removeable power tool 300 when mounted on the power tool stand 100. This makes the power tool stand 100 more stable when the removeable power tool 300 is mounted on the power tool carriage 106.

By mounting the removeable battery 130 on an opposite side of the power tool carriage 106 on a different side of the projecting frame 104, the weight of the removeable battery 130 provides a counterweight to the weight of the removeable power tool 300. This further improves the stability of the power tool stand 100 when the removeable power tool 300 and the removeable battery 130 are mounted on the power tool stand 100.

FIG. 4 shows another side view of the power tool stand 100 without the removeable power tool 300 mounted on the power tool stand 100.

In some examples, the removeable battery 130 optionally projects over the base 102 by a distance X. By projecting the removeable battery 130 over the base 102, this further increases the stability of the power tool stand 100.

The removeable battery 130 as shown in the accompanying Figures is only a single battery pack mounted on the power tool carriage 106. However, in other examples, the power tool carriage 106 comprises a plurality of battery interfaces 204 mounted on the power tool carriage 106 configured to electrically and mechanically connected a plurality of removeable batteries 130. For example, two removeable batteries 130 can be mounted on the power tool carriage 106 side by side. Alternatively, any number of removeable batteries 130 can be mounted on a similar number of battery interfaces 204.

Figure 7:
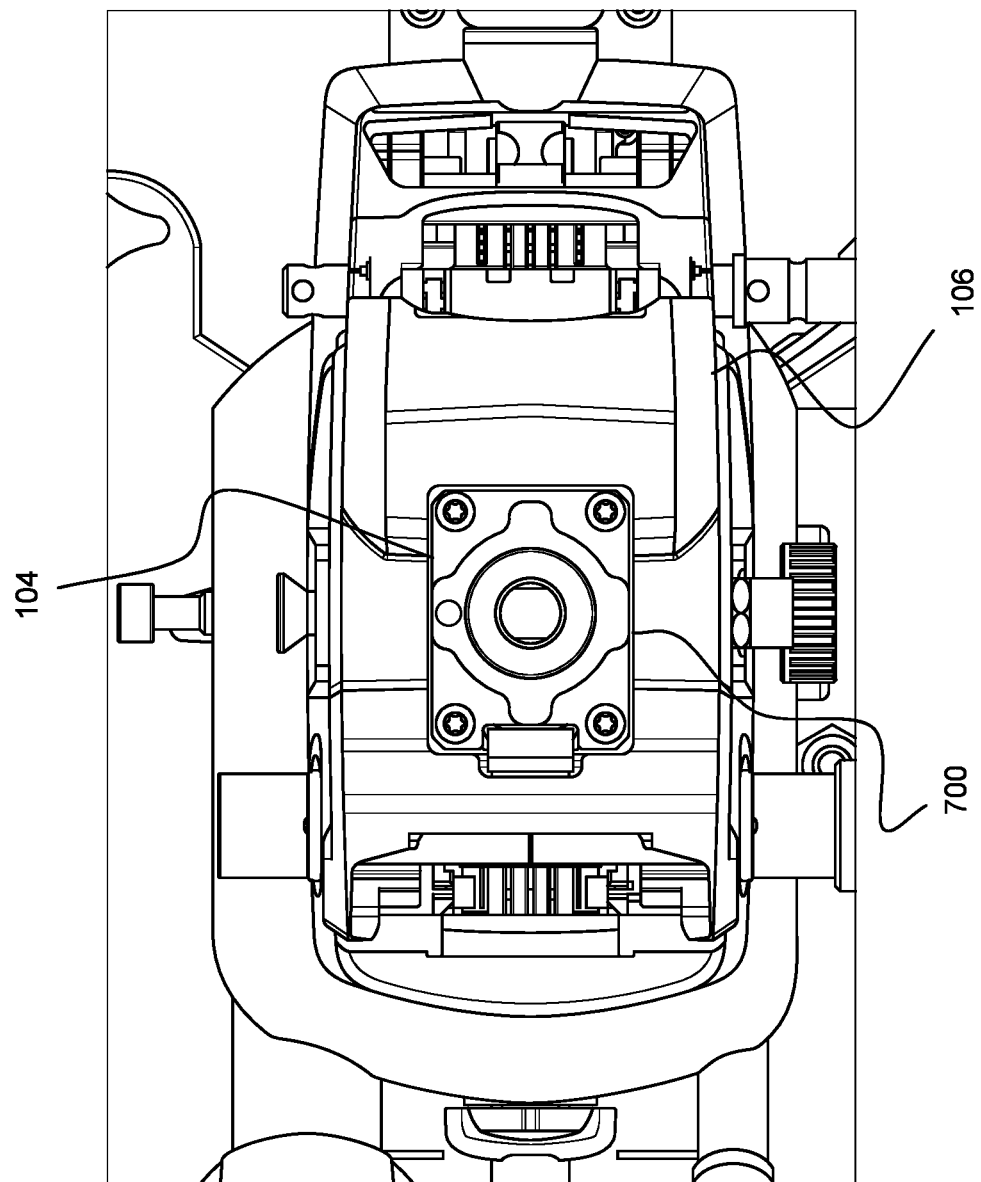
FIG. 7 shows a partial plan view of the power tool stand of an example.

The carriage mechanism 500 of the power tool carriage 106 will now be discussed in further reference to FIGS. 5 and 7. FIG. 7 shows a partial plan view of the power tool stand 100.

The carriage mechanism 500 is mounted within the carriage housing 200 and is arranged to move the power tool carriage 106 with respect to the projecting frame 104 when the carriage mechanism 500 is actuated. The projecting frame 104 projects through a through hole 700 in the carriage housing 200.

In some examples, the carriage mechanism 500 comprises a rack 504 and pinion mechanism for moving the power tool carriage 106 with respect to the projecting frame 104. A rack 504 is mounted on one side 506 of the projecting frame 104 along the length of the projecting frame 104. A drive gear 508 is mounted on a drive shaft 510 and a mechanism handle 620 is mounted on the drive shaft 510 for manually rotating the drive shaft 510. The drive gear 508 is optionally rotatably coupled to an intermediate gear 512 and the intermediate gear 512 engages the rack 504. In some other examples, the drive gear 508 directly engages with the rack 504.

The drive gear 508 and the intermediate gear 512 are the same size and have a 1:1 gear ratio. In other examples, the drive gear 508 can comprise less teeth than the intermediate gear 512 to provide a mechanical advantage. This may be useful so that the user does not have to exert excessive pressure on the handle when the cutting tool 212 (as shown in FIG. 2) engages the workpiece 406.

The drive gear 508 and the intermediate gear 512 are rotationally coupled together and so the direction of the intermediate gear 512 is reversed with respect to the rack 504. When the user rotates the mechanism handle 620 from the first side 206 (e.g. the view shown in FIG. 6*b*), the user pulls the mechanism handle 620 from the handle bottom 622 to move the power tool carriage 106 towards the base 102. Similarly, the user pulls the mechanism handle 620 from the handle top 624 to move the power tool carriage 106 away from the base 102. This means that operation of the mechanism handle 620 can be more ergonomic for the user.

Furthermore, by mounting the removeable power tool 300 on one side of the power tool carriage 106 and the removeable battery 130 on the other side of the power tool carriage 106, the carriage mechanism 500 is easier to actuate by the user.

When not actuated, the carriage mechanism 500 is further arranged to hold position the power tool carriage 106 with respect to the projecting frame 104. The carriage mechanism 500 in some examples is arranged to hold the position of the power tool carriage 106 in position due to frictional forces in the carriage mechanism 500. Additionally or alternatively, the carriage mechanism 500 comprises a locking mechanism (not shown) for positively locking the position of the power tool carriage 106 with respect to the projecting frame 104. In some examples, the locking mechanism comprises a locking pin which moves into engagement with the drive gear 508 and prevents rotation of the driver gear 508. In some further examples, the carriage mechanism 500 does not hold the position of the power tool carriage 106 with respect to the projecting frame 104 and the user must hold the mechanism handle 620 to maintain the position of the power tool carriage 106 on the projecting frame 104.

Turning back to FIG. 4, another example will now be described. In some examples, the power tool stand 100 comprises at least one accessory electrical interface 400 configured to connect to at least one accessory. The at least one accessory electrical interface 400 in some examples is an electrical socket 400. The electrical socket 400 is shown in FIG. 4 as a standard mains power socket, however, the electrical socket 400 in some examples is a low voltage or a DC voltage socket. In some examples, the electrical socket 400 is adapted for non-mains power plugs so that only low voltage or DC voltage accessories can be inserted into the electrical socket 400.

The electrical socket 400 is electrically connected to the battery interface 204 and/or the power tool interface 202. By connecting the electrical socket 400 to the battery interface 204, the removeable battery 130 can provide power to the electrical socket 400 when the removeable battery 130 is mounted to the battery interface 204.

In some examples, the accessory that is connected to the electrical socket 400 is a water pump (not shown) or a dust extractor (not shown). In other examples, the accessory can be any other suitable accessory such as a lamp, worksite radio or any other equipment used in the worksite.

In an alternative example, the accessory electrical interface 400 is connectable to an external power source and the accessory electrical interface 400 is electrically connected to the first electrical interface and/or the second electrical interface. In some examples, the external power source is a mains power supply or an external battery. When a mains power supply is connected to the accessory electrical interface 400, the mains power supply is arranged to power the removeable power tool 300 and/or charge the removeable battery 130 when the removeable power tool 300 and the removeable battery 130 are mounted on the power tool carriage 106.

In some examples, at least one illumination device 402 configured illuminate at least part of the removeable power tool 300 or the workpiece 406. The illumination device 402 illuminates an illuminated area 404 as shown in FIG. 4 with the dotted area.

In some examples, the illumination device 402 is orientated downwards and faces the base 102 or the workpiece 406. The illumination device 402 is mounted on an underside surface 314 of the power tool carriage 106 facing the base 102. In this way, the illumination device 402 lights the part of the workpiece 406 that the user will engage with the cutting tool 212. The cutting tool 212 is partially represented in FIG. 4 with a dotted outline. Accordingly, in some examples, the illuminated area 404 overlaps will at least a part of the removeable power tool 300 such as the cutting tool 212 when the removeable power tool 300 is mounted on the power tool carriage 106.

This may be helpful in construction sites where no external lighting has been installed yet. Whilst the illumination device 402 is directed downwards as shown in FIG. 4, in other examples the illumination device 402 can be directed in other directions. For example, the illumination device 402 can be mounted on the first side 206 or the second side 208 of the power tool carriage 106.

In some examples, the at least one illumination device 402 is one or more of an LED, a laser, or an incandescent bulb. In some preferred examples, the illumination device 402 is a plurality of white LEDs. Alternatively, if the illumination device 402 comprises a laser, the laser in some examples can mark a target intersection on the workpiece 406 with the cutting tool 212. For example, the laser is configured to mark a cross or another symbol on the workpiece 406 wherein the centre of the cross corresponds to the rotation of axis of the cutting tool 212 when the cutting tool 212 engages the workpiece 406. This can be helpful for the user to align the cutting tool 212 with the workpiece 406 to perform the correct cut.

In some examples, the illumination device 402 is in electrical connection with the power tool electrical interface 602 and/or the battery electrical interface 612 on the power tool carriage 106. Accordingly, the removeable battery 130 can provide power to the illumination device 402 when the removeable battery 130 is mounted to the battery interface 204. When both the removeable power tool 300 and the removeable battery 130 are mounted on the power tool carriage 106, the illumination device 402 may automatically turn on. In some examples, the illumination device 402 may actuate when the removeable power tool 300 is actuated. In some examples, the illumination device 402 is optionally connectable to the accessory electrical interface 400 via a plug/socket connection similar to the previously discussed accessories. Alternatively, the illumination device 402 is electrically connected to the battery interface 204 and/or the power tool interface 202 via one or more wires inside the power tool carriage 106.

Alternatively, the power tool stand 100 may comprise an auxiliary battery (not shown) mounted inside the power tool carriage 106 which is electrically connected to the illumination device 402. This means that the illumination device 402 is part of a separate electrical circuit to the removeable battery 130.

Another example will now be discussed in reference to FIG. 4. In some examples, the power tool carriage 106 comprises a switch 410 in electrical connection with the power tool electrical interface 602 and/or the battery electrical interface 612. The switch 410 is mounted on the carriage housing 200 and the switch 410 configured to selectively control actuation of the removeable power tool 300 when the removeable power tool 300 and the removeable battery 130 are mounted on the power tool carriage 106.

In some examples the switch 410 is an ON/OFF switch for the removable power tool 300. In some examples, the switch 410 is in series with an ON/OFF switch e.g. the power trigger switch 312 on the removeable power tool 300. In this way, the switch 410 must be actuated before the removeable power tool 300 is actuated. This reduces the chances of the removeable power tool 300 being accidentally actuated when mounted on the power tool carriage 106.

In some examples, the removeable power tool 300 is configured to lock a power trigger switch 312 in an actuated mode when the removeable power tool 300 is mounted on the power tool carriage 106. This means that the user does not have to switch on the power trigger switch 312 and the switch 410 in order to actuate the removeable power tool 300 when mounted on the power tool carriage 106.

In some other examples, the switch 410 is alternatively a safety switch 410 and arranged to interrupt the power to the removeable power tool 300 when the safety switch 410 actuated. For example, the safety switch 410 can be pushed down towards the power tool carriage 106 to break the circuit and deactivate the removable power tool 300.

In some examples, the switch 410 is configured to wirelessly actuate an external accessory (for example one or more of the previously discussed accessories such as a water pump, a dust extractor, a lamp, a worksite radio etc). In some examples, the switch 410 is configured to control a transmitter-receiver (not shown) mounted in the power tool carriage 106. The transmitter-receiver is configured to send a receive signals from another transmitter-receiver mounted in the removable power tool 300 and/or the external accessory. The transmitter-receiver is configured to transmit one or more control signals for controlling the removeable power tool 300 and/or the external accessory. In this way, the control of the removeable power tool 300 can be remotely actuated by the power tool carriage 106 via transmission of actuation signals. In some examples the transmitter-receiver mounted on the power tool carriage 106 is configured to transmit actuation signals directly to a transmitter-receiver mounted in the external accessory. Additionally or alternatively, transmitter-receiver mounted on the power tool carriage 106 is configured to transmit actuation signals indirectly to a transmitter-receiver mounted in the external accessory via a transmitter-receiver mounted in the removeable power tool 300. In this way, the switch 410 can send a signal to switch off the vacuum pump and the dust extractor. Optionally, the switch 410 can simultaneously control actuation of the removeable power tool 300 at the same time as controlling actuation of the external accessory.

Figure 8:
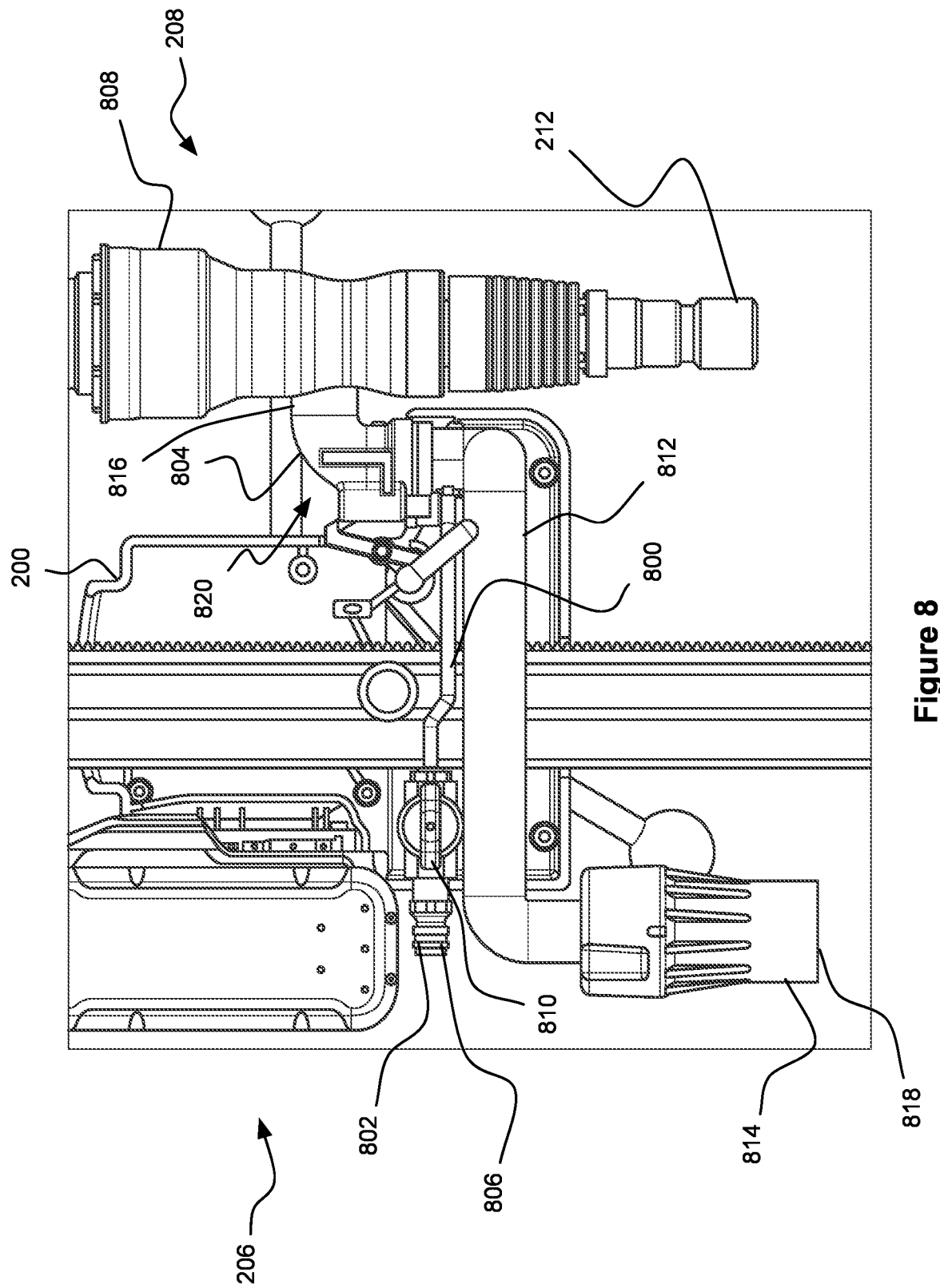
FIG. 8 shows a partial cross-sectional side view of the power tool stand of an example.
Figure 9:
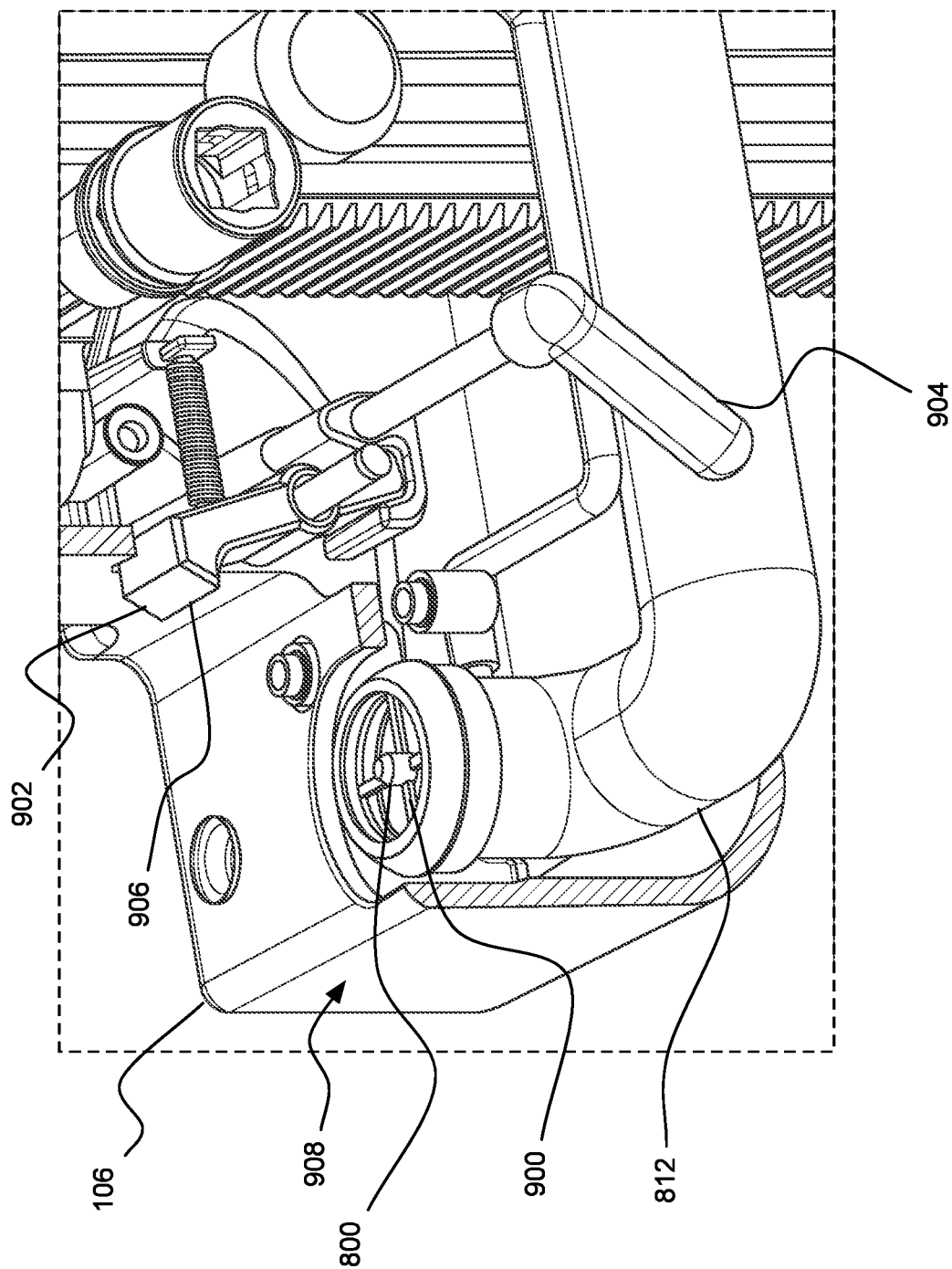
FIG. 9 shows a partial perspective cut-away view of the power tool stand of an example.
Figure 10:
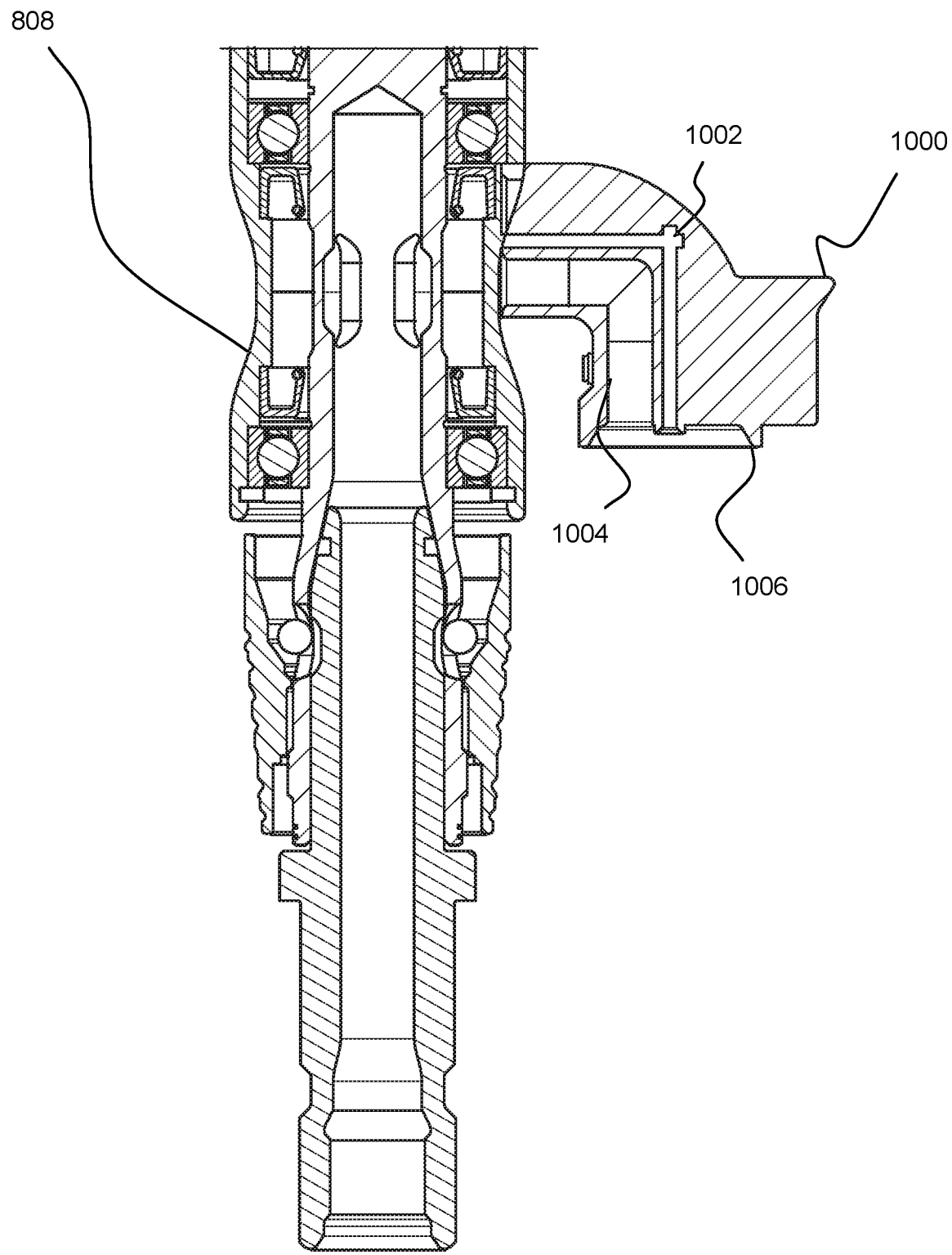
FIG. 10 shows a partial cross-sectional side view of the power tool stand of an example.

Another example will now be discussed with reference to FIGS. 8 to 10 in addition to the previously mentioned Figures. FIG. 8 shows a partial cross-sectional side view of the power tool stand 100. FIG. 9 shows a partial perspective view of the power tool stand 100. FIG. 10 shows a partial cross-sectional side view of a power tool stand 100.

As shown in FIGS. 5 and 8, in some examples, the power tool carriage 106 comprises at least one duct having a duct inlet 816 in fluid communication with a duct outlet 814. The duct inlet 816 can be connectable with a portion of the removeable power tool 300 when mounted on the power tool carriage 106. Alternatively, or additionally the duct inlet 816 is connectable with an accessory such as a nozzle (not shown).

In some examples, the at least one duct 800 is a water duct 800. The water duct 800 extends through the power tool carriage 106 from a water inlet 802 located on a first side 206 of the power tool carriage 106 to a water outlet 804 located on the second side 208 of the power tool carriage 106. The water inlet 802 is in fluid communication with the water outlet 804 and fluid e.g. water can flow from the water inlet 802 to the water outlet 804.

As shown in FIG. 8, the water duct 800 is housed inside the carriage housing 200. However, in other less preferred examples, the water duct 800 is mounted on an outer surface of the carriage housing 200. By passing the water duct 800 through the carriage housing 200, there are less hoses and pipes which can interfere with the removeable power tool 300 during operation.

The water inlet 802 is connectable to a water supply. In some examples, the water inlet 802 comprises a toolless connector 806 for connecting to a water hose. The toolless connector 806 allows for a snap fit connection between the water inlet 802 and a water hose (not shown).

The water outlet 804 in some examples comprises an optional nozzle (not shown) arranged to eject a spray of water on the cutting tool 212 in order to cool and lubricate the cutting tool 212. In some other examples, the water outlet 804 is connectable to an optional adapter 808 for guiding the flow of water around the cutting tool 212 and/or the removeable power tool 300. The adaptor 808 will be discussed in more detail below in reference to FIGS. 3, 8 and 10.

When the removeable power tool 300 is mounted on the power tool carriage 106, the water outlet 804 is located near a portion of the removeable power tool 300. In some examples, the water outlet 804 is located near or adjacent to the cutting tool 212. This means that power tool carriage 106 can provide a lubrication to the cutting tool 212 through the power tool carriage 106. This means that the removeable power tool 300 is easier to mount on the power tool stand 100 because water hoses etc. do not need to be installed and positioned after placing the removeable power tool 300 on the power tool stand 100. This also makes removal of the removeable power tool 300 from the power tool stand 100 because water hoses etc. do not need to be removed before removing the removeable power tool 300.

Indeed, the water duct 800 can be connected to the water supply independent of whether the removeable power tool 300 is mounted on the power tool carriage 106.

In some examples, the water duct 800 comprises a carriage valve 810 arranged to selectively adjust the flow of fluid to and/or from the portion of the removeable power tool 300. The carriage valve 810 is in fluid communication between the water inlet 802 and the water outlet 804. The carriage valve 810 is arranged to be adjustable by the user to selectively adjust the flow of water to the cutting tool 212. The user can optionally fully open or fully close the carriage valve 810 in order to actuate the flow of water through the water duct 800. Furthermore, the carriage valve 810 can optionally be positioned at any position between a fully closed and a fully opened state. This means that the user can adjust the flow rate by manipulating the carriage valve 810 on the power tool carriage 106 depending on the amount of lubrication required during a cutting operation. This is advantageous because the user does not have adjust the flow rate at the water supply, which may be remote from the power tool stand 100.

Additionally or alternatively, the at least one duct can be an air duct 812. The air duct 812 extends through the power tool carriage 106 from an air outlet 814 located on a first side 206 of the power tool carriage 106 to an air inlet 816 located on the second side 208 of the power tool carriage 106. The air outlet 814 is in fluid communication with the air inlet 816 and fluid e.g. air can flow in either direction between the air outlet 814 and the air inlet 816 depending on the requirements of the user. In most cases, the user will connect a vacuum supply to the air outlet 814 so that dust is sucked away from the cutting tool 212 via the air duct 812.

In some examples, the duct inlet 816 e.g. the air inlet 816 is connectable with a nozzle accessory (not shown). The nozzle accessory is mountable on the air inlet 816 and in fluid communication with the air inlet 816. The nozzle accessory may be in fluid communication with a portion of the power tool 300. In this way, an air flow path may extend from the nozzle accessory and through the at least one duct from the duct inlet 816 to the duct outlet 814.

As shown in FIG. 8, the air duct 812 is housed inside the carriage housing 200. However, in other less preferred examples, the air duct 812 is mounted on an outer surface of the carriage housing 200. By passing the air duct 812 through the carriage housing 200, there are less hoses and pipes which can interfere with the removeable power tool 300 during operation.

The air outlet 814 is connectable to an air supply and/or a vacuum supply. In some examples, the vacuum supply is a dust extractor (not shown) configured to suck dust, debris, water droplets etc. away from the cutting tool 212. In some examples, the air outlet 814 comprises a toolless connector 818 for connecting to a vacuum hose (not shown). In some examples, the toolless connector 818 allows for a friction fit connection between the air outlet 814 and the vacuum hose.

When the removeable power tool 300 is mounted on the power tool carriage 106, the air inlet 816 is located near a portion of the removeable power tool 300. In some examples, the air inlet 816 is located near or adjacent to the cutting tool 212. This means that power tool carriage 106 can provide dust/dirt extraction to the cutting tool 212 through the power tool carriage 106. This means that the removeable power tool 300 is easier to mount on the power tool stand 100 because hoses etc. do not need to be installed and positioned after placing the removeable power tool 300 on the power tool stand 100. This also makes removal of the removeable power tool 300 from the power tool stand 100 because hoses etc. do not need to be removed before removing the removeable power tool 300.

As discussed above, the removeable power tool 300 can be in fluid communication with the water duct 800 or the air duct 812. In some examples, the power tool carriage 106 only comprises a water duct 800 for providing a lubricating flow or water to the removeable power tool 300 or an air duct 812 for providing a dust extracting air flow from the removeable power tool 300.

In some examples, as shown in e.g. FIGS. 5 and 8, the power tool carriage 106 comprises both the water duct 800 and the air duct 812. In this way, both the water duct 800 and the air duct 812 are housed inside the carriage housing 200. However, in other less preferred examples, the water duct 800 and the air duct 812 is mounted on an outer surface of the carriage housing 200.

In some examples, the water duct 800 and the air duct 812 are routed through the carriage housing 200 separately. However, in some other examples, one of the water duct 800 and the air duct 812 are inside the other along a portion 820 of their length. In some examples, the water duct 800 and the air duct 812 are coaxial along a portion 820 of their length. As shown in FIG. 8, the water duct 800 is inside the air duct 812. The air duct 812 comprises a wider diameter to the water duct 800 and therefore the water duct 800 can fit inside the air duct 812 without impeding the air flow within the air duct 812 greatly. In some examples, optionally, the water duct 800 is positioned inside the air duct 812 along the portion of the air duct 812 within the carriage housing 200.

Along the coaxial portion 820, the water duct 800 is routed inside the air duct 812. In some examples, the water duct 800 is positioned inside the air duct 812. In some other less preferred examples, the air duct 812 is routed inside the water duct 800. However, the diameter of the water duct 800 is less than the diameter of the air duct 812 therefore a more compact arrangement can be achieved if the water duct 800 is positioned inside the air duct 812.

The water duct 800 is shown positioned within the air duct 812 in FIG. 9. In some examples, the water duct 800 is held in a coaxial position within the air duct 812 with a plurality of cross supports 900.

The water duct 800 and the air duct 812 can be routed along any suitable path through the carriage housing 200. FIG. 9 shows an arrangement whereby the water duct 800 and the air duct 812 are optionally engageable with an adaptor 808. However, in some examples, the adaptor 808 is not needed and the water outlet 804 and the air inlet 816 are positioned close to the removeable power tool 300 and/or the cutting tool 212 when the removeable power tool 300 is mounted on the power tool stand 100.

The adaptor 808 in some examples is fixed on the removeable power tool 300. In this way the adaptor 808 is removed from the power tool stand 100 when the removeable power tool 300 is unmounted from the power tool stand 100.

The adaptor 808 is optionally releasably mountable to the power tool carriage 106 via a biased latch mechanism 902. The latch mechanism 902 comprises a hook portion 906 for engaging with a reciprocal recess or lip 1000 (as shown in FIG. 10). The latch mechanism 902 secures the adaptor 808 to the power tool carriage 106. The latch mechanism 902 is moveable from a locked position to an unlocked position with a pivotable release lever 904. The latch mechanism 902 provides a snap-fit mounting of the adaptor 808 on the power tool carriage 106.

In other examples, no latch mechanism 902 is provided and the adaptor 808 secures to the power tool carriage 106 with a friction fit or another suitable securing mechanism e.g. clips, clamps etc.

The adaptor 808 will be described in further detail in reference to FIG. 10. The adaptor 808 comprises a water guide duct 1002 and an air guide duct 1004. The water guide duct 1002 is in fluid communication with one or more parts of the removeable power tool 300. Lubricating water flow from the water guide duct 1002 on to e.g. the cutting tool 212. Similarly, the air guide duct 1004 is in fluid communication with one or more parts of the removeable power tool 300. The dust and water can be sucked into the air guide duct 1004 during operation of the removeable power tool 300.

The adaptor 808 comprises a mating port 1006 for engaging with the water duct 800 and the air duct 812.

The adaptor 808 can comprise any shape or form for guiding water and air to and from the removeable power tool 300. Another example of the adaptor 316 is shown in FIG. 3. The adaptor 316 as shown in FIG. 3 is functionally the same as shown in FIGS. 8 to 10 except that the water guide duct 1002 and the air guide duct 1004 are routed along a different path. In FIG. 3 the adaptor 316 is formed from a hollow front handle 318 and the water guide duct 1002 and the air guide duct 1004 are positioned within the hollow front handle 318. The hollow handle 318 is arranged to mate with a reciprocal combined water and air outlet 134 as shown in FIG. 1. The combined water and air outlet 134 has a similar construction to the combined outlet 908 as shown in FIG. 9. When the hollow front handle 318 is engaged with the combined water and air outlet 134, water an air can flow respectively in the water guide duct 1002 and the air guide duct 1004. The removeable power tool 300 is therefore in fluid communication with both the water supply and the vacuum supply.

The adaptor 316 as shown in FIG. 3 optionally comprises an adaptor valve 320 for adjusting the flow rate of the water to the cutting tool 212. The adaptor valve 320 is similar in functionality to the carriage valve 810 as shown in FIG. 8. In another example, two or more examples or features are combined. Features of one example can be combined with features of other examples e.g. any of the features described above in on example or shown in one or more Figures can be combined with one or more other features described above or shown in one or more Figures.

Examples of the present disclosure have been discussed with particular reference to the examples illustrated. However, it will be appreciated that variations and modifications may be made to the examples described within the scope of the disclosure.

What is claimed is:

1. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
wherein the at least one duct comprises an inlet on a first side of the power tool carriage.

2. The power tool stand of claim 1, wherein the at least one duct comprises a water duct connectable to a supply of water.

3. The power tool stand of claim 1, wherein the at least one duct comprises an air duct connectable to supply of air or a vacuum supply.

4. The power tool stand of claim 1, wherein the inlet comprises a toolless connection configured to connect to a water hose, an air hose, or a vacuum hose.

5. The power tool stand of claim 1, wherein the power tool carriage is slidable along a longitudinal axis of the projecting frame.

6. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
wherein the at least one duct comprises an air duct and a water duct with one of the air duct or the water duct inside the other of the air duct or the water duct other along at least a portion of their length.

7. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
wherein the duct inlet is connectable with a portion of the removeable power tool or a nozzle when the power tool is mounted on the power tool carriage.

8. The power tool stand of claim 7, wherein the at least one duct comprises an inlet on a first side of the power tool carriage.

9. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
further comprising an adaptor connectable to the at least one duct and mountable on the removeable power tool, wherein the adaptor comprises a guide duct arranged to guide fluid to or from a cutting tool.

10. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
wherein the at least one duct comprises an outlet on a same side of the power tool carriage as the tool interface.

11. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
wherein the at least one duct is connectable to a valve configured to selectively adjust a flow of fluid to or from the removeable power tool when the power tool is mounted to the power tool carriage.

12. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and wherein the power tool carriage comprises a housing and the at least one duct is routed inside the housing.

13. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
further comprising a lock movable between a locked position to secure the removeable power tool to the power tool carriage and an unlocked position to enable release the removeable power tool from the power tool carriage.

14. A power tool stand comprising
a base;
a projecting frame connected to the base;
a power tool carriage moveably mounted on the projecting frame; and
a tool interface mounted on the power tool carriage configured to secure a removeable power tool;
wherein the power tool carriage comprises at least one duct having a duct inlet in fluid communication with a duct outlet; and
further comprising a battery interface mounted on the power tool carriage and configured to mechanically and electrically connect a removeable battery to the power tool carriage.

15. The power tool stand of claim 14, wherein the battery interface is electrically connected to the tool interface to enable the removable battery to deliver power to the power tool when the power tool and the battery are coupled to the power tool carriage.

16. The power tool stand of claim 15, wherein the power tool carriage comprises at least one accessory electrical interface configured to connect to at least one accessory.

17. The power tool stand of claim 16, wherein the at least one accessory electrical interface is electrically connected to the battery interface such that the removeable battery may supply power to the at least one accessory when the removeable battery is mounted on the battery interface and the at least one accessory is electrically connected to the at least one accessory electrical interface.

18. A power tool stand comprising
a base;
a projecting frame connected to the base;
a power tool carriage moveably mounted on the projecting frame; and
a tool interface coupled to the power tool carriage and configured to couple to a removeable power tool;
a battery interface coupled to the power tool carriage and configured to couple to a removable battery;
a first duct coupled to the power tool carriage and configured to be fluidly coupled to at least one of an output duct of a water supply, an output duct of an air supply, or an input duct of a vacuum supply.

19. The power tool stand of claim 18, wherein the battery interface is electrically connected to the tool interface to enable the battery to deliver power to the power tool when the power tool and the battery are coupled to the power tool carriage.

20. The power tool stand of claim 18, further comprising an accessory electrical interface electrically coupled to the battery interface to deliver electrical power from the battery to at least one of the water supply, the air supply, or the vacuum supply.

* * * * *